May 5, 1925.
J. KAMBORIAN
1,536,866
PROCESS OF MAKING RUBBER SHOES
Filed Feb. 8, 1921
2 Sheets-Sheet 1
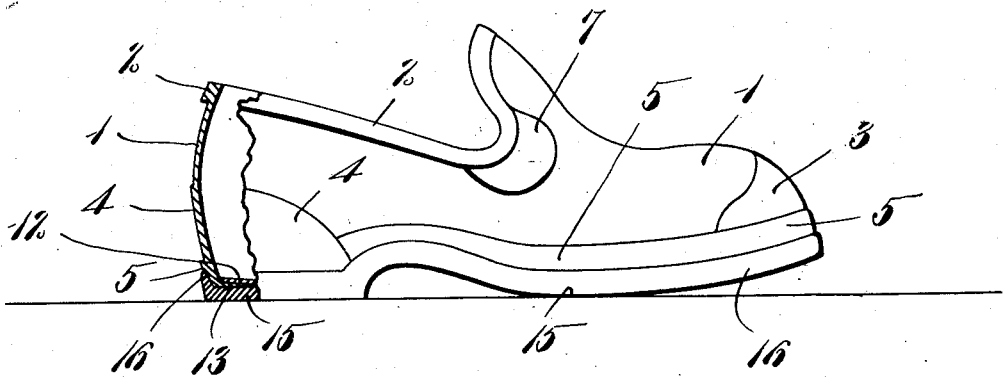
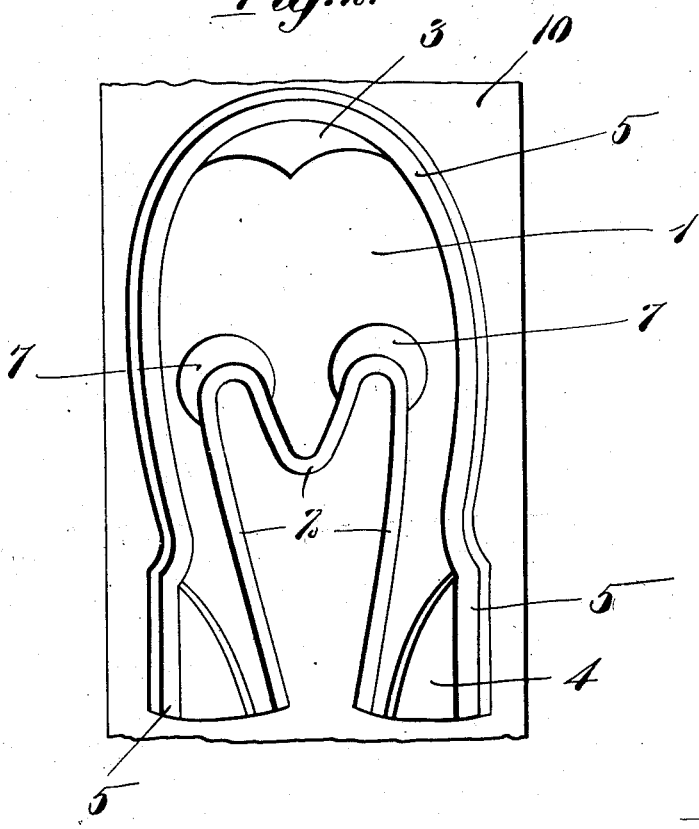

May 5, 1925.  
J. KAMBORIAN  
1,536,866
PROCESS OF MAKING RUBBER SHOES
Filed Feb. 8, 1921   2 Sheets-Sheet 2
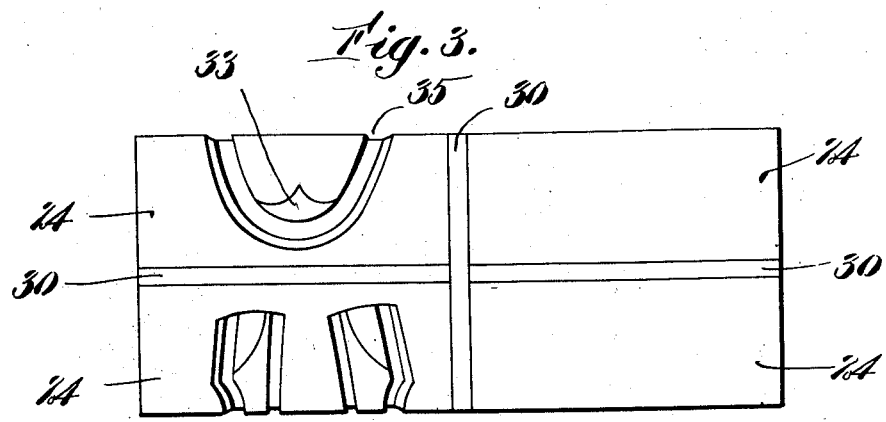
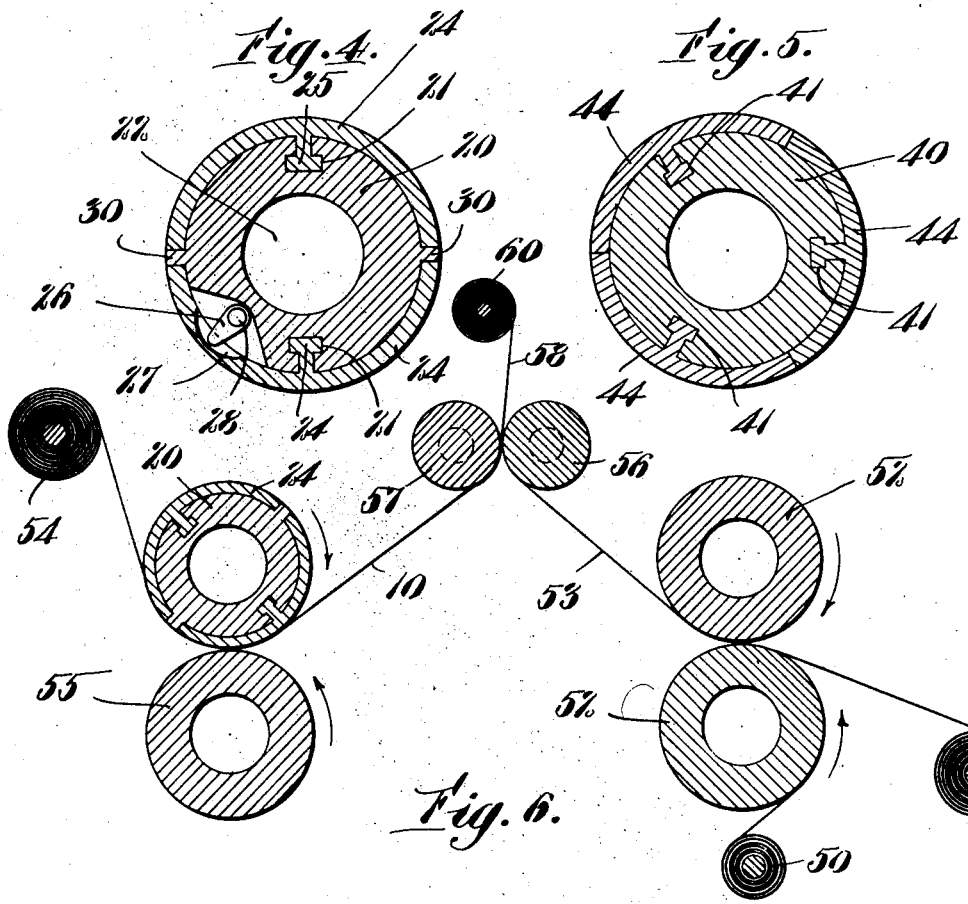
Inventor:
Jacob Kamborian
by James R. Hodder
att'y.

Patented May 5, 1925.

1,536,866

UNITED STATES PATENT OFFICE.

JACOB KAMBORIAN, OF WATERTOWN, MASSACHUSETTS.

PROCESS OF MAKING RUBBER SHOES.

Application filed February 8, 1921. Serial No. 443,439.

*To all whom it may concern:*

Be it known that I, JACOB KAMBORIAN, a citizen of Armenia, and resident of Watertown, in the county of Middlesex and State of Massachusetts, have invented an Improvement in Processes of Making Rubber Shoes, of which the following description, in connection with the accompanying drawings, is a specification, like letters on the drawings representing like parts.

My present invention is an improved and novel rubber shoe construction, and an improved method of construction for making the rubber shoe.

In the manufacture of rubber footwear, particularly rubber overshoes, rubber boots, etc., a considerable number of hand operations are now required. The handling of rubber in thin sheets and layers, particularly when in plastic and warm or moldable state, presents many difficulties, and the building of different sections, parts, layers, etc., into the shoe structure, requires a plurality of successive hand operations. Thus in present day manufacturing methods, it is customary to assemble the rubber shoe materials upon a last, these materials at first consisting in merely the lining and insole; then to apply the reinforcing members at toe, at heel, at edges, etc., which are strips or layers of rubber, or rubberlike compounds, put on by hand, and rolled into place by hand rollers. The piping around the lower margin of the upper, at its juncture with the sole materials, is also a strip of rubberlike material, put on by hand and rolled by the operator. These various hand applying and hand rolling actions necessarily involved a great deal of time, work and inaccuracy, since the hand rolling is difficult and must be skillfully performed or the piping, reinforcing layers, or the like, will not be firmly incorporated into the shoe structure, but will leave damaged places, leaks, etc., and present parts which quickly separate and give way.

My invention is intended to avoid the difficulties above noted and to eliminate the many hand operations heretofore necessary. In carrying out my invention, I provide a substantially one-piece rubber shoe upper, forming the reinforcing portions, such as the toe tip, counter, top margin and bottom pipings—as well as any other reinforced portions—all of one integral mass. With the upper materials thus formed with the reinforcing portions, piping, etc., as one solid substance, I can then cut out these upper blanks and with the single operation of assembling the upper on the last, I have the same ready for the instant application of the outsole. Thus I am enabled to do away with all the prior hand operations of applying the reinforcing layers, parts, strips, piping, etc., as well as saving the hand rolling necessary for each of these operations, while also eliminating the danger of not having the hand rolling thoroughly incorporate the reinforced layer into the shoe structure, thus doing away with damaged articles. In fact, all that is necessary in completing my improved shoe, after the upper materials are formed, as will be hereinafter described, consists in the assembling of the insole and upper materials on the last, then applying the outsole, turning up the edge of the outsole, and completing the shoe by the rolling action of the outsole. Therefore my improved rubber boot or shoe comprises a substantially one-piece upper, having formed directly thereon the reinforcing parts and layers which have heretofore been applied separately, and in the novel process of so forming the upper, and uniting both upper and outsole together with a single rolling operation.

Referring to the drawings illustrating preferred embodiments of the invention,

Fig. 1 is a side view, partly shown in section, of my improved rubber footwear;

Fig. 2 is a plan view illustrating the forming of the upper with the reinforcements integral therewith;

Fig. 3 is a side view of my improved die;

Figs. 4 and 5 being cross-sectional views transversely of the die; and

Fig. 6 is a diagrammatic view illustrating the preferred method of manufacture.

As shown in Figs. 1 and 2, I make the upper of my novel shoe, designated generally at 1, of combined textile and rubber or rubberlike material, for the principal thickness of the shoe, forming said upper with the marginal reinforced edge portion 2 of extra or double thickness, the toe portion 3 also of double thickness, the counter 4 and piping 5 similarly reinforced with an added mass of rubber or rubber and textile layers, as well as the throat reinforcing 7, 7, all as an integral and homogeneous part of the rubber or rubber and textile upper 1. In order to so form these reinforcing margins, pipings, toe cap, etc., in this manner, I subject the sheet of rubberlike material designated generally at 10, or I subject a portion of the sheet 10 as it is formed to the action of a die, which will force or flow the rubber into the positions and contour of the reinforced parts desired. It will be appreciated that during the construction of the rubberlike sheet 10, it is necessary to have the rubber coating or coatings plastic and mobile, and at this stage the material can be readily conformed into the shape, thickness and contour desired for the pattern of the shoe upper. The shoe upper thus impressed, embossed or formed, is then cut from the sheet 10, and assembled on a last with an insole 12, the marginal portion of the piping being fitted under the insole as illustrated at 13, Fig. 1. Thereupon the outsole 15 is applied, and has its marginal portion 16 turned upwardly over the piping and rolled into close adhesion and incorporation with the upper materials, thus completing the shoe.

I am enabled to produce, therefore, a completed rubber shoe, by an extremely simple process and presenting the desirable features of a one piece upper, the entire shoe upper and shoe sole being closely and perfectly united by the very simple operations of rolling the marginal part 13 of the piping on the bottom of the last and the edge 16 of the shoe sole on the sides.

As thus made my improved shoe presents a strong, unitary structure, and without danger of the piping or other reinforcing portions becoming separated, admitting water or presenting loose or damaged edges.

In making the upper thus reinforced at desirable points, I prefer to employ an improved die, as illustrated in Figs. 3, 4 and 5, and may carry out one or several processes as a continuous operation, which will now be explained. While the reinforced one-piece upper may be formed as shown in Figs. 1 and 2 by any suitable means, such as a fixed stamp, by hand, or by a rotary die, I prefer to use the rotatable die shown in Figs. 3, 4 and 5. This die comprises a hollow metallic member 20, having therein a plurality of undercut grooves 21, 21, the die member 20 being hollow as indicated at 22 for the admission of steam or other heat. To the member 20 is applied a removable and detachable outer shell 24, 24, being formed with a projecting locking portion 25 adapted to slide into the undercut groove 21, these sections sliding in from either end, and being locked in position by the turning of a latch 26 adapted to engage a transverse groove 27 in the shell, the latch being mounted on a shaft 28 and extending outwardly through an adjacent end of the die, as will be clearly understood on referring to Fig. 4. The shell member or members constitute removable die sections, each section having formed on its outer surface an embossed or contoured part adapted to impress its reverse contour onto the sheet material 10 during the manufacturing process thereof, and thus to flow or conform the rubber or rubberlike material in said sheet into the corresponding contour of the dies. For example, the reinforced or increased thickness afforded by the piping 5, would be made by the depression 35 in the die. Reinforcement at the toe 3 would be formed by 33, etc.

I may desire to form these die sections entirely around the member 1 or interposing reinforcing ribs 30, 30, illustrated, thus giving a plurality of sections 24, and each removable. By having the sections of the die removable I secure the advantage of being able to quickly and easily change from one style or size of shoe, to another, without shifting the dies 20. In Fig. 5 I have illustrated the die 40 with the undercut grooves 41, 41, 41, therein, having a plurality of die sections 44, 44, reaching entirely around the die and eliminating the ribs 30. This construction also has the advantage of carrying the contour entirely around the die surface without interruption. These dies may be used at various or different stages in operation upon the sheet 10. Where thin rubber stock is employed, it may be suitable to form the impressions on the sheet 10, while the latter is in the process of its manufacture, comprising simply the textile material and the first layer of rubber. Preferably however I utilize my die on the second or final layer of rubber, which is usually applied to constitute the upper materials, in the sheet 10.

Thus for example, as shown in Fig. 6, a supply of rubber indicated diagrammatically at 50, and a supply of textile on a reel or other suitable source 51, are led to heated rolls 52 and 53, where the textile material and the first layer of rubber or rubberlike material are consolidated into the upper lining and portions 53. The main or top layer of rubber 54, is then led around the heated roller having the die shells 24 thereon, and cooperating with a smooth surfaced roller 55, thus forming the impressed sections or patterns on the sheet 10, which latter is led to a pair of rolls 56 and 57, where the combination of the sheet 10 and lining and rubber layer 53 are consolidated into the completed shoe upper material 58, the latter being collected on a roll or spindle 60 from which it can be unrolled and the pattern sections 1 cut therefrom or the entire process can be made as a continuous operation and the sheet material conducted directly from the rolls 56 and 57 to the cutting place or table, where the patterns are removed.

My process thus consists in a means and method of uniting the textile and rubber materials constituting the substance for the upper of rubber footwear, by rollers, and in a mechanical way, with the reinforcements desired for margin, heel, toe, piping, etc., formed thereon. This method is more expeditious and economical than where the pipings and layers are applied by hand and also my method is much more efficient and insures a waterproof shoe.

While I have shown in Fig. 6 the position of the embossed or die roller as acting upon the sheet 10 consisting in the final or topmost rubber layer for the shoe, it will be appreciated that I can also use such a die either at one of the rolls 52, or in place of the roller 56 or 57, if desired, the material still being in its plastic state at these positions and capable of flowing or taking the reverse contour of the die. By my process, I eliminate all the hand work of fitting, positioning, smoothing down and rolling the necessary reinforcing portions and layers by hand, as has heretofore been necessary, and I provide a shoe construction of much neater appearance, stronger, more uniformly waterproof, and cheaper than has heretofore been possible.

My invention is further described and defined in the form of claims as follows:

1. The improved process of manufacturing rubber footwear, which consists in uniting with the sheet material from which the upper materials are cut, a plurality of layers integrally united while plastic having formed thereon varying reinforcing thicknesses at predetermined parts.

2. The improved process of manufacturing rubber footwear, which consists in uniting to the sheet material from which the upper materials are cut, a plurality of layers having formed thereon increased reinforcing thicknesses at the top and bottom marginal portions of the upper to be cut from said layers, thus automatically producing reinforced portions at predetermined parts.

3. The improved process of manufacturing rubber footwear, which consists in uniting to the sheet material from which the upper materials are cut, a plurality of layers having formed thereon increased reinforcing thicknesses at the top and bottom marginal portions of the upper to be cut from said layers, said reinforcing parts being formed during the process of uniting the plurality of layers together into a homogeneous mass.

4. The improved process of manufacturing rubber footwear, which consists in uniting to the sheet material from which the upper materials are cut, a plurality of layers having formed thereon increased reinforcing thicknesses at the top and bottom marginal portions of the upper to be cut from said layers, said reinforcing parts being formed during the process of uniting the plurality of layers together, by a continuous feeding and rolling action.

5. The improved process of manufacturing rubber footwear, which consists in uniting to the sheet material from which the upper materials are cut, a plurality of layers having formed thereon increased reinforcing thickness at the top and bottom marginal portions of the upper to be cut from said layers, said reinforcing parts being formed during the process of uniting the plurality of layers together by an engraved die operating upon the stock during the process of manufacturing.

In testimony whereof, I have signed my name to this specification.

JACOB KAMBORIAN.